US005660470A

United States Patent [19]
Mench

[11] Patent Number: 5,660,470
[45] Date of Patent: Aug. 26, 1997

[54] RAIL MOUNTED SCANNER

[75] Inventor: Paul D. Mench, Chattanooga, Tenn.

[73] Assignee: Southern Technologies Corp., Chattanooga, Tenn.

[21] Appl. No.: 596,063

[22] Filed: Feb. 6, 1996

[51] Int. Cl.[6] .............................. G01J 5/04; G01K 1/14; G01K 13/08; B61K 9/04; B61L 3/00
[52] U.S. Cl. ........................ 374/121; 374/141; 374/153; 246/169 D; 246/169 R; 246/DIG. 1; 246/DIG. 2; D33/1 Q; D33/286; D33/651
[58] Field of Search ...................... 374/121, 124, 374/141, 153, 208; 246/169 D, 169 A, 169 R, DIG. 1, DIG. 2; 33/1 Q, 286, 287, 651, 645

[56] References Cited

U.S. PATENT DOCUMENTS

| 2,970,210 | 1/1961 | Willey | 246/169 D |
|---|---|---|---|
| 3,108,771 | 10/1963 | Pelino et al. | 246/169 D |
| 3,183,349 | 5/1965 | Barnes et al. | 246/169 D |
| 3,461,284 | 8/1969 | Joy | 246/169 D |
| 4,654,973 | 4/1987 | Worthy | 33/1 Q |
| 4,659,043 | 4/1987 | Gallagher | 246/169 D |
| 4,958,440 | 9/1990 | Pipes | 33/651 |
| 5,100,243 | 3/1992 | Grosskopf et al. | 374/121 |
| 5,133,521 | 7/1992 | Gutauskas | 246/169 R |
| 5,161,312 | 11/1992 | Theurer et al. | 33/1 Q |
| 5,331,311 | 7/1994 | Doctor | 246/169 D |

FOREIGN PATENT DOCUMENTS

| 1918317 | 11/1979 | Germany | 246/169 A |
|---|---|---|---|
| 0837527 | 6/1960 | United Kingdom | 246/169 D |
| 2075183 | 11/1981 | United Kingdom | 246/169 D |

*Primary Examiner*—Diego F. F. Gutierrez
*Attorney, Agent, or Firm*—Alan Ruderman

[57] ABSTRACT

A housing having a base having a cavity within which a temperature scanner module may be mounted and which is readily clamped to a rail of a railroad track so that a scanner may detect an over-heated wheel or wheel bearing. The base includes a rail clamp support portion for extending beneath the rail. A clamping assembly is positioned on the clamp support portion with resilient compressible bumpers sandwiched therebetween. The clamping assembly includes a first rail clamp and a pair of spaced apart arms between which a second rail clamp is positioned and adjustably attached to the first clamping assembly so as to secure the assembly to a rail. The arms of the clamping assembly terminate at locations above the upper surface of the clamp support portion and may be forcibly urged to apply a bending moment to the clamping assembly adjacent the cavity to pivot the clamping assembly on the bumpers relative to the base. The base may thus be angularly adjusted relative to the rail.

11 Claims, 5 Drawing Sheets

RAIL MOUNTED SCANNER

BACKGROUND OF THE INVENTION

This invention relates to rail mounted temperature scanners and more particularly to a housing for mounting such scanners to a railroad rail which permits ready adjustment of the scanning angle.

It is known to monitor the temperature of the wheels and the wheel bearing of freight railway cars to detect overheating conditions and thereby determine if a wheel or a wheel bearing failure is imminent. Such failures, of course, may be disastrous. A wheel scanner is known in the art as a "hot wheel detector" while a bearing scanner is known as a "hot box detector." Monitoring apparatus for monitoring these temperatures includes an infrared sensor and associated optics mounted within a housing, the sensor measuring the difference between an ambient temperature, such as the bottom of a railway car, and that of the wheel or of the bearing. There may be a shutter mechanism to prevent dust and dirt from entering and contacting the optics or the scanner during periods of inactivity such as when a train is not passing. Other assemblies may be included as part of the scanner, such as a moisture and snow removal heater or, as accessories which turn the system on, determine the speed and direction of the train and other required functions, and analyze and convey the temperature information from the scanner to the train engineer, and may include an alarm when an overheating condition is reported.

The housing within which the scanner of a hot box detector is mounted includes clamping elements for clamping the housing to a rail of the railroad track. The housing is clamped to position the scanner outboard of the rail. In the case of a hot box detector, the scanner geometry may be such as to be an outboard scanner designed to scan the bearing end cap and the outer seal ring of a bearing housing or may be an inboard scanner designed to scan the inner seal ring area of the bearing housing. The hot wheel detectors in the prior art have been mounted off the rail by approximately 8 feet and scan horizontally at an angle to view the wheels at both sides of the train.

The scanners must be correctly and consistently aimed at the wheel or the wheel bearing during train passage. The scanners are located on the outside or outboard of the rail and aimed upwardly at an angle to a certain point above the rail and from the gauge of the rail. In the prior art, in order to adjust the aiming of the scanner, the housing cover and a plate had to be removed and shims inserted. This procedure is time consuming and may not be totally accurate or reliable.

SUMMARY OF THE INVENTION

Accordingly, it is a primary object of the present invention to provide apparatus for mounting a railroad wheel and wheel bearing temperature scanner that permits the scanner to be set at a selected angle and to be adjusted precisely for reliably detecting overheated conditions of such wheel and wheel bearings.

It is another object of the present invention to provide a housing within which railroad wheel and railroad wheel bearing scanners may be mounted, the housing having a window through which the scanner may view the wheel or bearing and being readily clamped to a rail of a railroad track and being adjustable accurately to change the angular disposition of the scanner and thereby aim the scanner at a preselected point.

It is a further object of the present invention to provide a housing for mounting a railroad wheel or wheel bearing temperature scanner, the housing being readily clampable to a rail of a railroad track by means of adjustable clamp means which not only secures the housing to the rail but which includes means for pivoting the housing relative to the rail to position the scanner at a proper angular disposition for detecting overheating conditions of wheels or wheel bearings passing by the clamped location.

Accordingly, the present invention provides a housing within which a temperature scanner module may be mounted and which is readily clamped to a rail of a railroad track for scanning either a railroad wheel or a railroad wheel bearing. The housing includes a base member having a storage cavity within which the scanner module is mounted and may scan through a window in the top of the housing, the base member including a clamp support portion which extends beneath the rail of the track. A first clamping member is disposed on the clamp support portion and is attached to the base portion adjacent the scanner storage cavity with resilient compressible bumpers therebetween. The first clamping member includes a rail clamp assembly adjacent the scanner storage cavity and has a pair of bifurcated arms which extend beneath the rail and receive an adjustable second rail clamp assembly therebetween which may be moved toward and away from the first rail clamp assembly to secure the housing to the rail. The bifurcated arms of the first rail clamp assembly terminate at locations spaced above the arm portion of the base member and is adjustable toward and away from the base to pivotably move the base member and thus the scanner module about the bumpers relative to the rail as the compression of the bumpers is increased or decreased. An optional optical alignment fixture positioned across the rails of the track and having a vertically and horizontally extendible target sight operates in conjunction with a reflector block removably positionable in the window of the housing to aid in precisely adjusting at least the wheel bearing scanner to a selected point.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENTS

Figure 1:
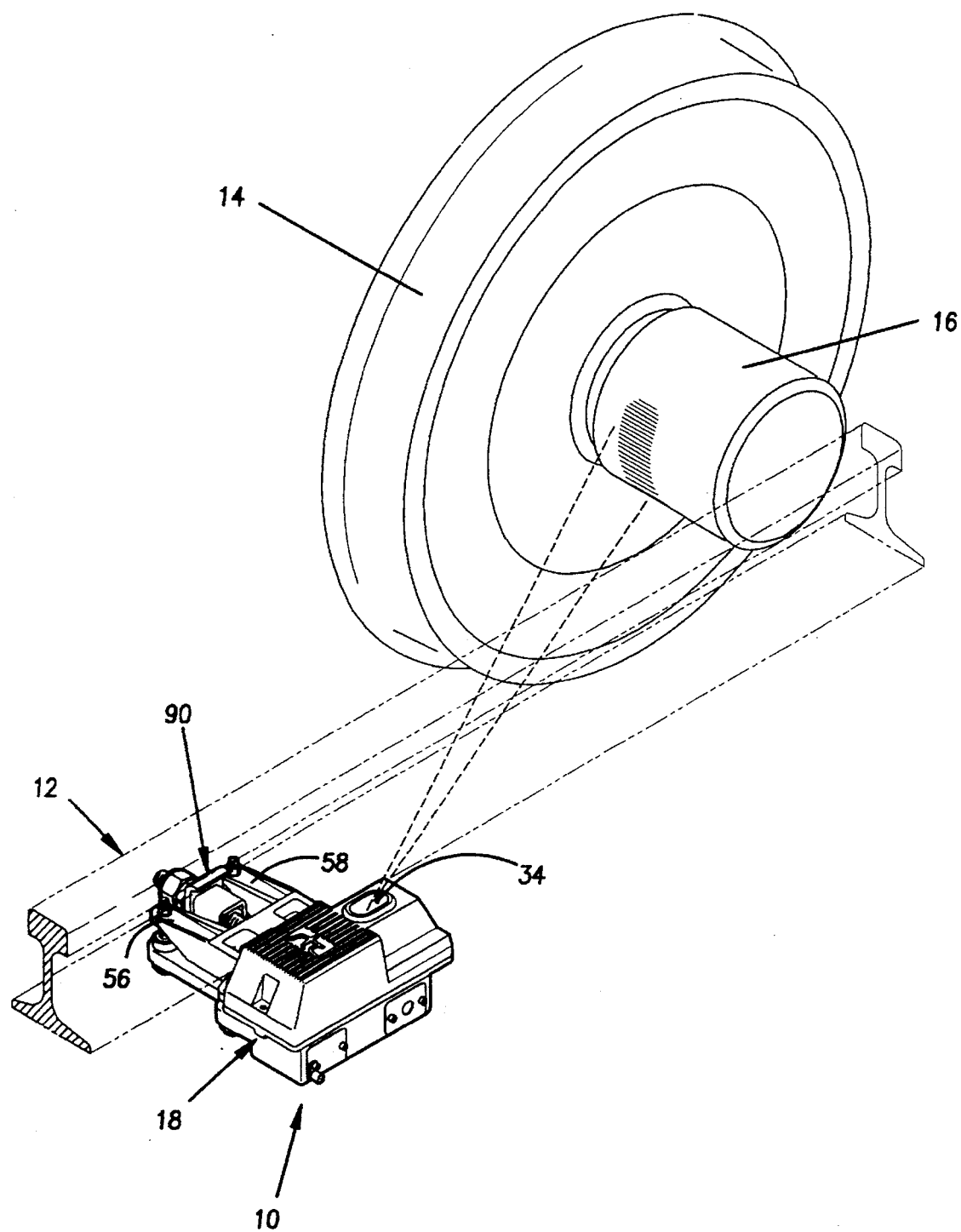
FIG. 1 is a perspective view of a wheel bearing scanner housing constructed in accordance with the principles of the present invention illustrated in an operative position for scanning the inboard portion of a wheel bearing.
Figure 2:
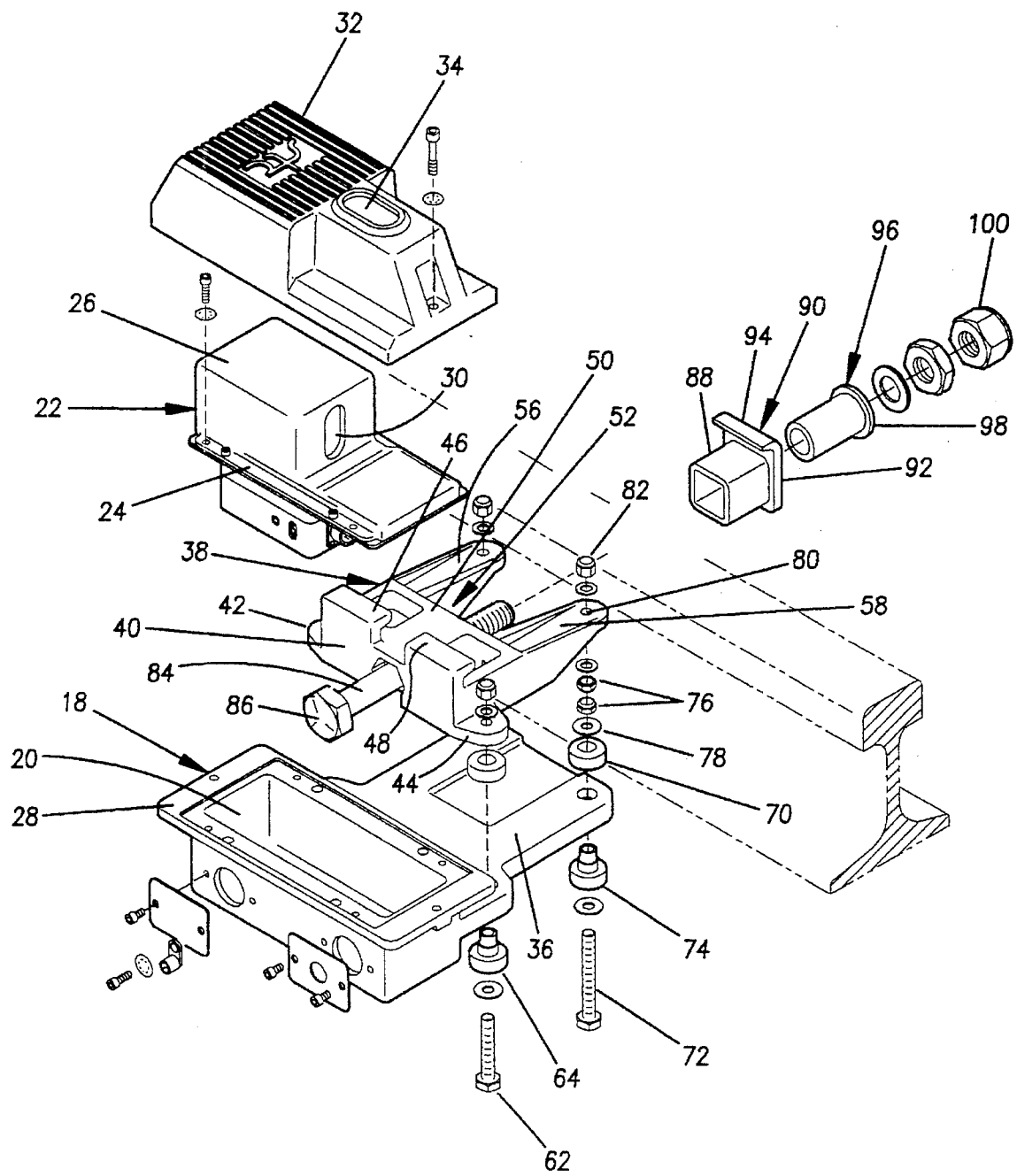
FIG. 2 is an exploded perspective view of the wheel bearing scanner housing illustrated in FIG. 1 and showing the scanner module.

Referring now to the drawings, FIG. 1 illustrates a wheel bearing scanning housing 10 disposed in an operative position secured on a railroad rail 12, shown in phantom, at the outboard side thereof. The wheel 14 of a railroad car is depicted as disposed on the rail, the wheel bearing 16 extending outboard of the wheel 14. The scanner housing 10 includes a base member 18 which, as best illustrated in FIG. 2, has a substantially rectangular shape cavity or well 20 in which a now conventional infrared temperature scanning module 22 is disposed, the module preferably having a peripheral flange 24 about a protective housing 26 which rests on and is secured to a lip 28 about the base member at the upper border of the cavity. The temperature module has an infrared sensor (not illustrated) disposed therein at an angular disposition for viewing through an opening 30 in the scanner protective housing 26. A weather cover 32, fastened to the base member 18 of the housing 10 encloses the scanner module within the cavity 20. An oval shaped window 34 is disposed in the upper surface of the weather cover 32 and permits the infrared sensor to view not only through the opening 30 but also through the window 34 so that the scanner may scan the temperature of the wheel bearing 16 and also the bottom of the railroad cars when the cars pass over the track at the location of the scanner housing, a shutter member (not illustrated) within the scanner module acting to open when a train is at the location and to close when not.

Figure 3:
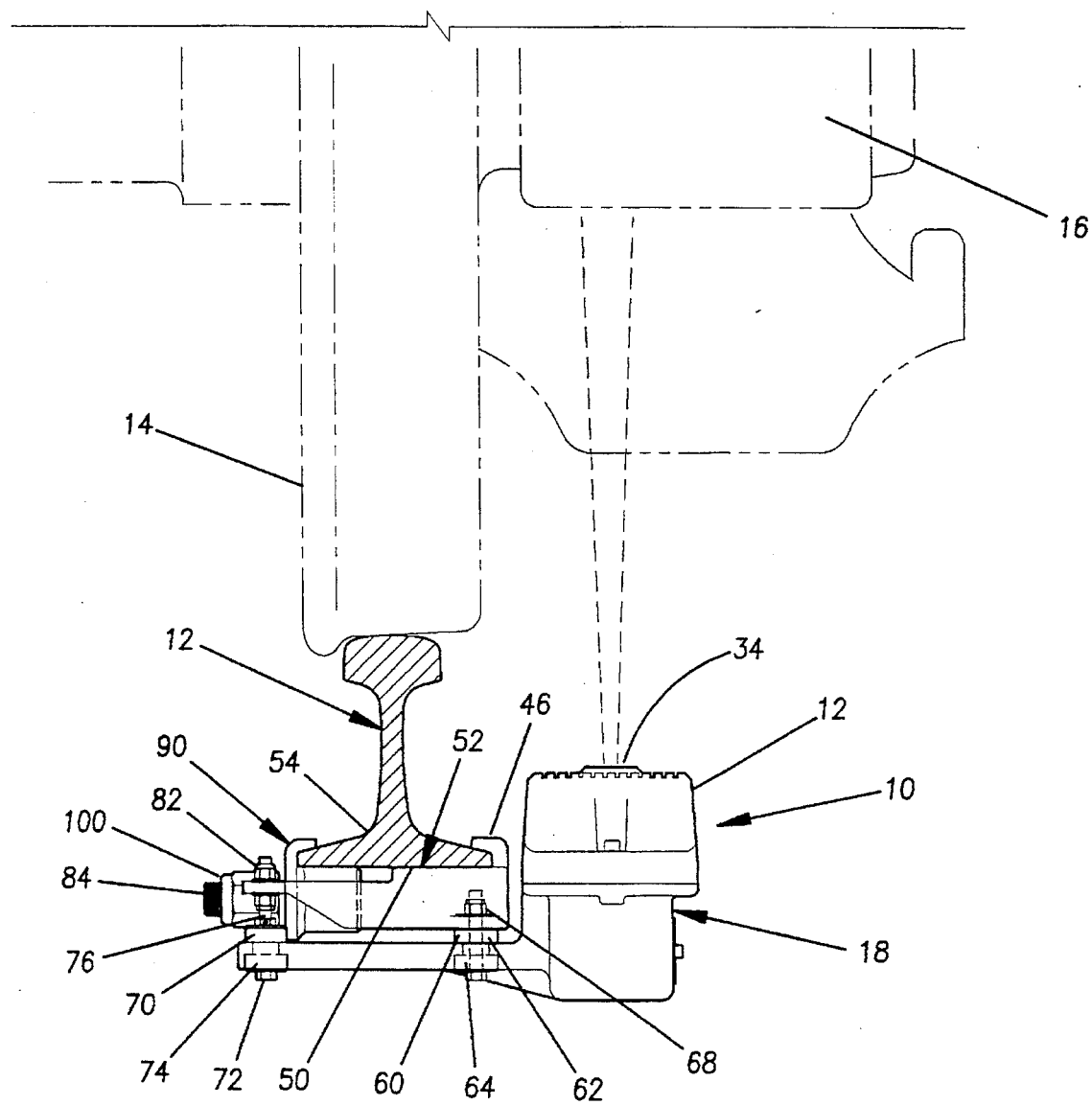
FIG. 3 is an end elevational view of the wheel bearing scanner housing illustrated in FIG. 1 mounted on a rail which is depicted in cross section.

Extending from the portion of the base member within which the cavity 20 is formed, is a clamp support portion 36. The upper surface of the clamp support portion is located below the level of the lip 28 of the base member cavity while its lower surface may be at or slightly above the level of the base member cavity portion. As best illustrated in FIG. 3, the clamp support portion 36 in its operative position extends beneath the rail 12 from the outboard side to the inboard side while the module containing cavity portion of the base member is disposed at the outboard side of the rail. Disposed on the clamp support member 36 is a first clamping member 38 which includes a wall 40 adjacent the portion of the base member containing the cavity 20. The Wall 40 extends upwardly from a bottom surface and has a pair of oppositely disposed feet 42, 44 extending laterally outwardly, i.e., substantially parallel to the direction of elongation of the rail 12.

At the upper end of the wall 40 is a pair of spaced apart outboard rail clamps 46, 48 having vertical portions forming a continuation of the wall 40 and horizontal portions extending away from the scanner module cavity and terminating at free ends disposed above a floor surface 50 of a central portion 52 of the first clamping member. The cross sectional shape of the rail clamps 46, 48 is such that the lower flange 54 of the rail 12 may be snugly received within the vertical and horizontal portions with approximately half of the lower surface of the flange 54 resting on the surface 50 as illustrated in FIG. 3. Extending from the central portion 52 of the first clamping member in the direction remote from the cavity 20 is a pair of laterally spaced apart legs 56, 58. Each leg 56, 58 is shaped so that it terminates at the free end disposed vertically above the upper surface of the central portion 52 and thus the lower surface of the feet 42, 44, and effectively form lever arms as hereinafter will become clear.

Positioned between the lower surface of each foot 42, 44 and the upper surface of the clamp support portion 36 of the base member 18 is a respective elastomeric bushing 60 which may be rubber or synthetic material. A threaded member such as a bolt 62 extends upwardly through a respective elastomeric vibration absorbing bushing 64, through a respective aperture in the base, through the bushing 60 and is received through an aperture 66 in each respective foot 42, 44. A tapped member such as a nut 68 above each foot receives the respective bolt for securing the first clamping member to the clamp support portion adjacent the cavity portion of the base. Disposed on the upper surface of the clamp support portion 36 of the base 18 beneath each of the legs 56, 58 is a respective elastomeric bushing 70. An elongated threaded member such as a bolt 72 extends upwardly through a respective elastomeric bushing 74 and through a respective aperture in the base member and is received through the bushing 70. Each bolt is fastened by a securing means such as a pair of nuts 76 acting against a washer 78 which in turn acts to compress the bushing 70. Additionally, the bolts 72 extend upwardly above the nuts 76 and are received through a respective aperture 80 in each of the legs 56, 58 adjacent the free end of the legs. A securing means such as a nut 82, or any other threaded member which may translate axially along the bolt when rotated, is received about each bolt 72 preferably with a washer disposed about the bolt and between the nut and the respective leg 56, 58.

When the nut 82 is rotated about the bolt 72 in a first direction it forces the free end of the respective leg 56, 58 toward the base member, and when rotated in the opposite direction permits the free ends of the legs 56, 58 to move away from the base member as the feet 42, 44 of the first clamping member further compress or relieve some compression on the elastomeric bushing 60. Thus, legs 56, 58 act as lever arms to apply a moment and the first clamping member effectively pivots on the bushings 60 about the feet 42, 44 adjacent the cavity relative to the base member. When the first clamping member is secured to the rail, however, this relative pivotable movement results in the base member being pivoted relative to the rail and thus to the bearing of a train which passes over the rail so that the angle of the scanner housing may be adjusted relative to the bearing. The amount of such adjustability need not be great and, with the present invention, the angle may be adjusted by approximately two degrees at each side of a base setting, i.e., plus or minus two degrees.

Extending through an opening in the wall 40 between the rail clamps 46, 48 is an elongated bolt such as a carriage bolt 84, the opening in the wall extending through the central portion 52. The opening may merely be a tunnel formed beneath the central portion, and the head 86 of the bolt 84 is enlarged relative to the opening so that it may abut the wall 40. The bolt 84 extends beyond the central portion 52 between the legs 56, 58 and is received within a hollow substantially rectangular shaped extension 88 of a second or inboard rail clamp 90. The rail clamp 90 includes a vertical portion 92 and a horizontal portion 94 which extends toward the scanner module cavity and terminates in a free end disposed above the upper wall of the extension 88. The cross sectional shape of the rail clamp 90 is such that a portion of the lower flange 54 of the rail which is not resting on the surface 50, may rest on the upper wall of the extension 88, and the lower edge of the flange 54 of the rail may be snugly received between the vertical and horizontal portions 92, 94 respectively of the rail clamp, as illustrated in FIG. 3. Positioned within the hollow of the extension 88 is a bushing 96 having a flange 98 which abuts the exterior of the vertical wall of the rail clamp 90, the belt 84 extending between the bushing and being received within a nut 100. Rotation of the nut forces washer means against the flange 98 and draws the rail clamp 90 toward the outboard rail clamps 46, 48 to secure the scanner housing tightly about the lower flange 54 of the rail. The top surface of the weather cover 32 is then approximately four inches below the upper surface of the top flange of the rail 12. After the scanner housing is secured to the rail in this manner, the angular relationship of the base member may be adjusted relative to the first clamping member as heretofore described.

Figure 4:
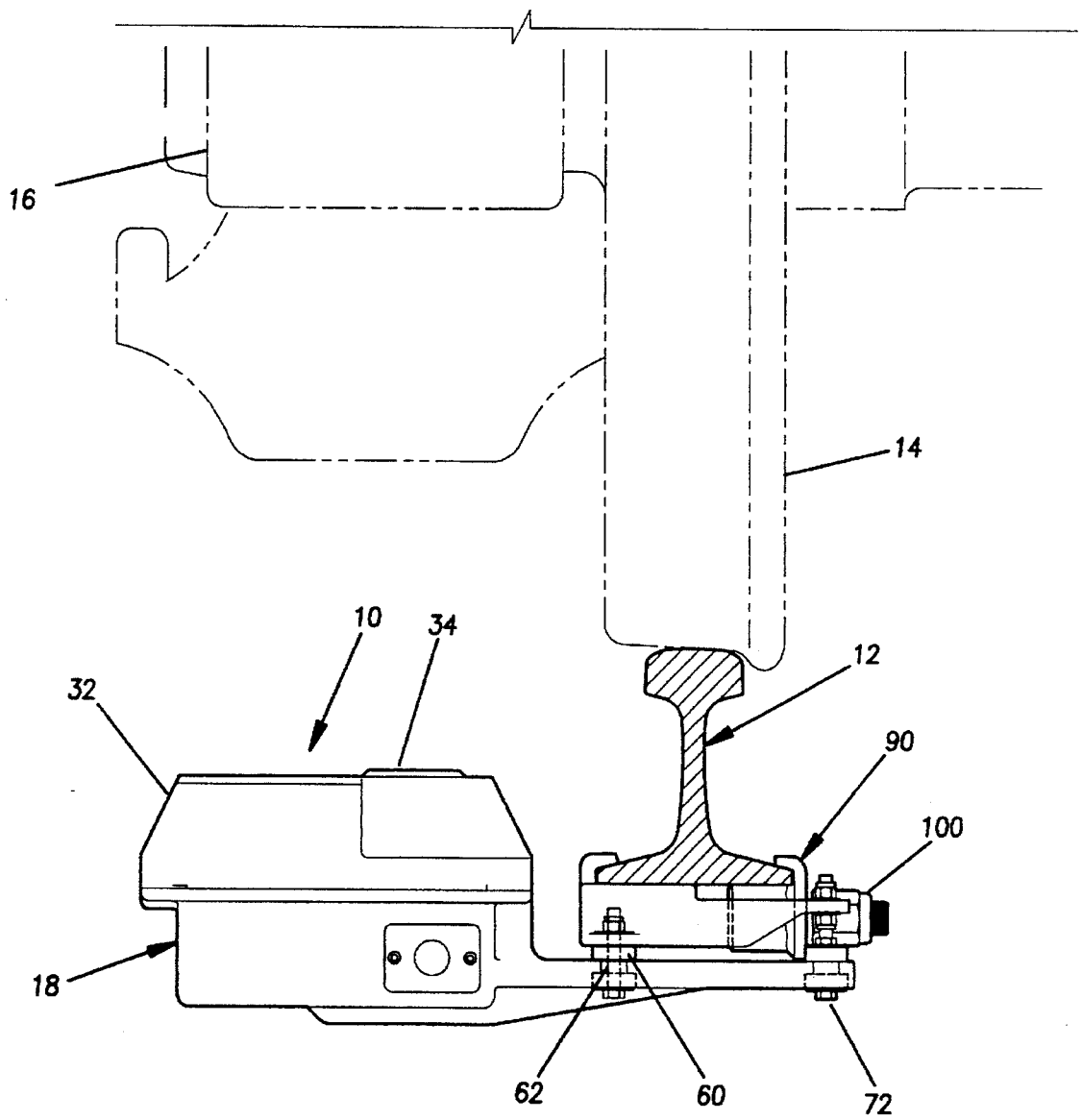
FIG. 4 is a view similar to FIG. 3 of a wheel scanner housing.

The hot wheel detector illustrated in FIG. 4 is identical to the wheel bearing scanner heretofore described. The only difference between the hot wheel detector and the wheel bearing detector is the shape of the base member. Rather than the rectangular shape of the cavity 20 having its major axis extending parallel to the rail, the major axis of the cavity extends substantially normal to the railroad rail. The weather cover 32 thus has the window 34 aligned so that the temperature scanner may view a wheel passing by through this window. In all other respects, including the rail mounting arrangement and the means for changing the angle of the housing relative to the rail, the hot wheel detector housing is identical with that of the wheel bearing detector housing.

Figure 5:
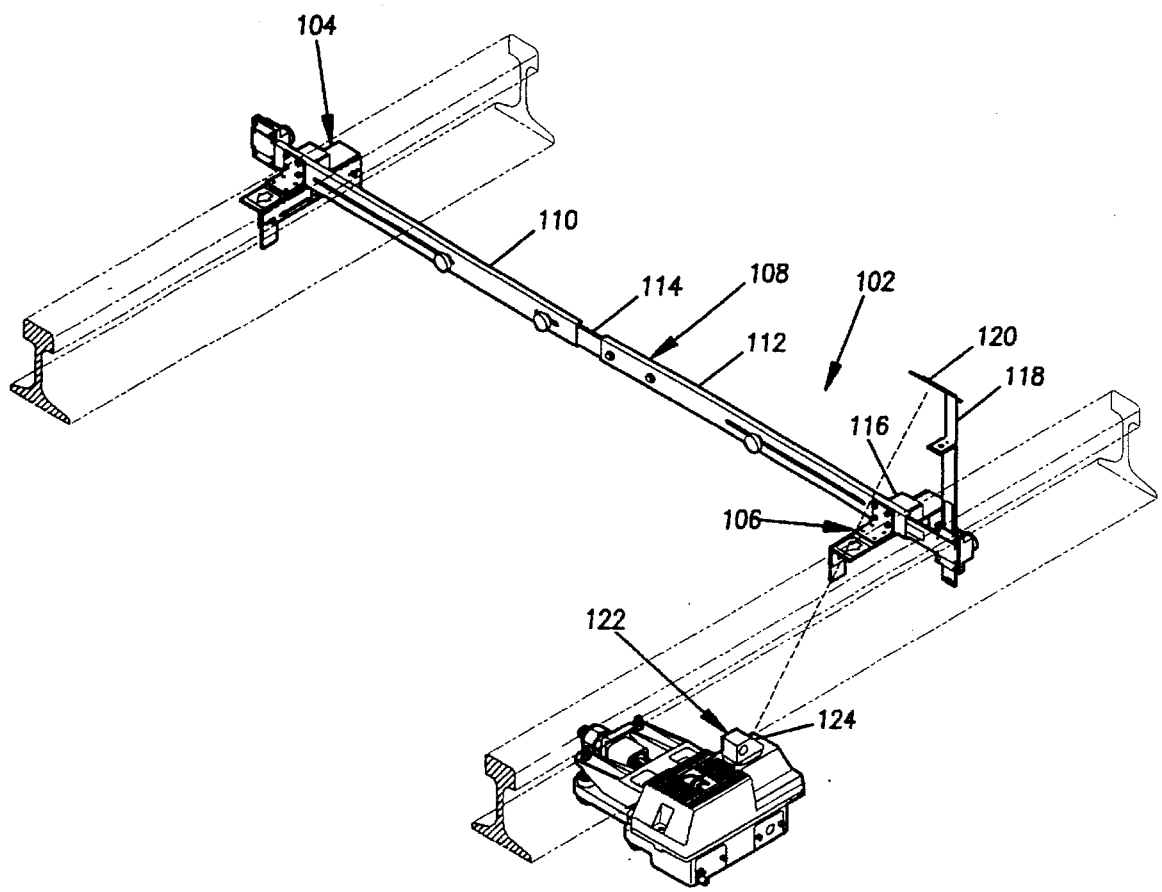
FIG. 5 is a perspective view of the wheel bearing scanner housing of FIG. 1 with a reflector block mounted in the window and illustrating an alignment fixture for adjusting the scanning point above the rail.

In accordance with another aspect of the present invention the aiming point for the scanner, at least the hot box detector, that is the bearing scanner, may be readily set by using an alignment fixture 102 as illustrated in FIG. 5. The fixture comprises a pair of spaced apart bracket assemblies 104, 106 removably positioned on the upper flange of both rails 12, and an adjustable rail spanning assembly 108 is connected to the bracket assemblies. The spanning assembly 108 comprises a pair of elongated arms 110, 112 connected together by a telescopically received bar 114 which is adjustably secured to the arms so that the brackets 104, 106 are properly disposed on the rails, the arms 110, 112 being constructed from electrical insulation material such as fiberglass to prevent shunting across the rails. At least the arm 112 is also adjustably received within and extends freely out of the bracket 106. The free end of the arm 112, that is the arm at the same side of the rail as the bearing detector, has a block 116 with a vertical slot for telescopically adjustably receiving a post 118. The post 118 and the horizontally disposed arm 112 may be equipped with graduated scales to give indications relative to the top of the rail and the gauge from the rail.

At the top of the post 118 is a square shaped target sight 120 inclined at an angle relative to the upper surface of the weather cover 32 at the same angle as the infrared scanner mounted within the scanner module 22. The target sight 120 has a pair of diametrically extending cross hairs drawn or etched thereon. At the intersection of the cross hairs, i.e., the center of the target sight 120, there is a small sight hole. Removably positioned in the window 34 of the weather cover 32 of the scanner housing is a target block 122. The bottom of the target block includes a downwardly extending boss (not illustrated) of the same oval shape as the window so that it may be snugly received therein with the block resting on the adjacent upper surface of the cover 32. The target block has a reflective mirror surface 124 inclined relative to the upper surface of the cover at the same angle as the infrared scanner mounted within the scanner module 22, the mirror surface being square shape and having a small circle drawn or etched in the center thereof. Thus, the target sight 120 and the reflective surface 124 are inclined at the same angle.

In order to set the angle of the scanner housing, the target sight 120 is adjustably positioned vertically above the rail and horizontally outwardly of the rail to set the hole in the target sight 120 to the desired prescribed distances merely by adjusting the post 118 vertically within the block 116 and adjusting the arm 112 horizontally relative to the bracket 106. Thereafter one may sight through the hole in the target sight to align the hole therein with the circle on the surface 124. The nuts 82 are tightened or loosened until the hole in the sight and the circle are precisely aligned. When that occurs, the scanner angle is set accurately for scanning the wheel bearings when a train passes, and the fixture is removed from the rails.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A housing for mounting a temperature scanner adjacent a rail of a railroad track comprising, a base member including a scanner mounting portion and a rail clamping portion extending from said scanner mounting portion, a rail clamp assembly positioned on said clamping portion having first clamp means and a pair of spaced apart arms, second clamp means removably and adjustably connected between said arms to said first clamp means, resiliently compressible bumper means, means for securing said rail clamp assembly and said bumper means to said rail clamping portion adjacent said scanner mounting portion with said arms extending away from said scanner mounting portion and with said bumper means disposed intermediate said first clamp means and said clamping portion, said arms having free ends spaced above said rail clamping portion, and means for connecting said free ends to said clamping portion and for applying a bending moment to said rail clamp assembly, to pivot said assembly on said bumper means relative to said rail clamping portion.

2. A housing as recited in claim 1, wherein said means for securing said rail clamp assembly and said bumper means to said rail clamping portion includes elongated members extending through said bumper means.

3. A housing as recited in claim 2, wherein said bumper means comprises elastomeric members.

4. A housing as recited in claim 1, wherein said means for connecting said free ends to said clamping portion and for applying a bending moment to said rail clamp assembly comprise threaded rod means extending through each arm adjacent the free ends and through said rail clamping portion, and means rotatably mounted on each said rod means and acting against the respective arm.

5. A housing as recited in claim 4, wherein said means for securing said rail clamp assembly and said bumper means to said rail clamping portion includes elongated members extending through said bumper means.

6. A housing as recited in claim 5, wherein said bumper means comprises elastomeric members.

7. A housing for mounting a temperature scanner adjacent a rail of a railroad track for detecting over-heated wheel or wheel bearing conditions of a railroad train, said rail having an upper flange on which a wheel of the train may roll and a bottom flange, said housing comprising a base member having a scanner mounting portion including a cavity for receiving said scanner and a clamp support portion including a support surface extending from said scanner mounting portion for receipt beneath said bottom flange of said rail when said scanner mounting portion is adjacent and outboard of said rail relative to a train, a first clamping member having a floor and a first rail clamping means disposed above said floor adjacent said scanner mounting portion for grasping an outboard edge of said bottom flange of said rail, and a pair of spaced apart arms extending remotely from said rail clamping means, said arms terminating in free ends disposed at an elevation above said floor, resiliently compressible bumper means disposed intermediate said floor and said support surface adjacent said scanner mounting portion, means for securing said first clamping member to said clamp support portion with said bumper means intermediate said floor and said support surface, means for fastening said arms to said clamp support portion with said free ends elevated above said support surface, second clamp means disposed intermediate said arms and adjustable toward said first clamp means for grasping an inboard edge of said bottom flange of said rail to thereby secure said base member to said rail, and means for forcing said free ends of said arms selectively towards and away from said support surface to compress and relieve compression of said bumper means so as to pivot said base member relative to said first and second clamping means for adjusting the angle of the base member relative to the rail.

8. A housing as recited in claim 7, wherein said means for securing said first clamping member to said clamp support portion comprises threaded rod means, and said bumper means comprise elastomeric washers disposed about said rod means.

9. A housing as recited in claim 7, wherein said means for fastening said arms to said clamp support portion includes threaded rod means extending through each arm adjacent the free ends and through said clamp support portion, and said means for forcing said free ends of said arms selectively comprises means rotatably mounted on each said rod and acting against the respective arm.

10. A housing as recited in claim 9, wherein said means for securing said first clamping member to said clamp support portion comprises threaded rod means, and said bumper means comprise elastomeric washers disposed about said rod means.

11. A housing as recited in claim 7, including a cover disposed on said base member for closing said cavity, said cover having a window through which said said scanner may view, a block removably positioned in said window having a reflective surface including a target formed thereon, in combination with fixture means supported on said rail and having a target sight member adjustably positioned vertically and horizontally to a selected scanning point, said sight member including an aperture for sighting said reflective surface to aid in adjusting the angle of said base member relative to said rail until said target is sighted through said aperture.

* * * * *